No. 870,058. PATENTED NOV. 5, 1907.
F. P. SPARMAKER.
CASKET TRUCK.
APPLICATION FILED APR. 17, 1907.

2 SHEETS—SHEET 1.

Witnesses:
Haines D. Albright
Henry B. Tauresey

Inventor:
Frank P. Sparmaker
By William J. Jackson.
Atty.

No. 870,058. PATENTED NOV. 5, 1907.
F. P. SPARMAKER.
CASKET TRUCK.
APPLICATION FILED APR. 17, 1907.
2 SHEETS—SHEET 2.
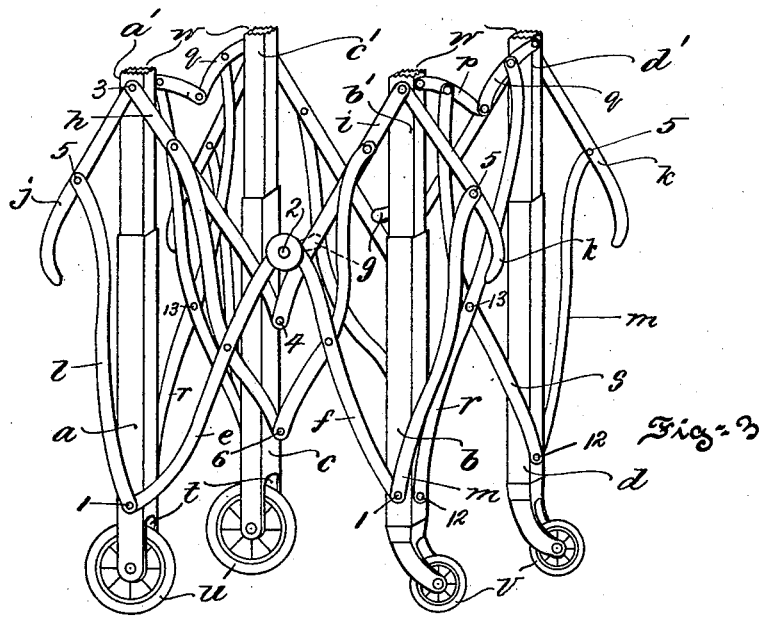
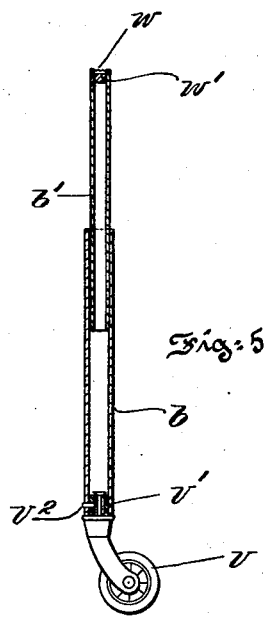
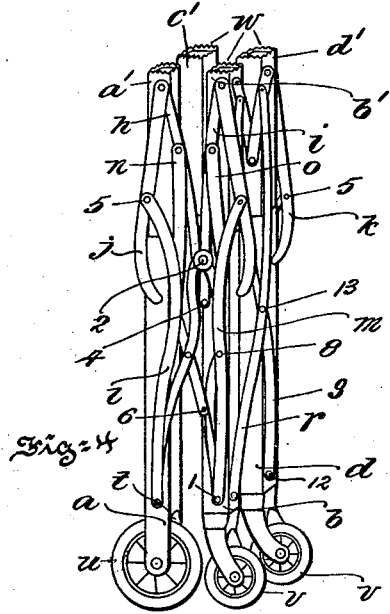

UNITED STATES PATENT OFFICE.

FRANK P. SPARMAKER, OF WOODBURY, NEW JERSEY, ASSIGNOR TO H. S. ECKELS & COMPANY, OF PHILADELPHIA, PENNSYLVANIA, A CORPORATION OF PENNSYLVANIA.

CASKET-TRUCK.

No. 870,058.

Specification of Letters Patent.

Patented Nov. 5, 1907.

Application filed April 17, 1907. Serial No. 368,645.

*To all whom it may concern:*

Be it known that I, FRANK P. SPARMAKER, a citizen of the United States, residing at Woodbury, in the county of Gloucester and State of New Jersey, have invented a certain new and useful Casket-Truck, of which the following is a specification.

One object of the present invention is to provide a collapsible truck so constructed, arranged and connected that it may be folded into smaller, more regular and less bulky compass for transportation and storage purposes than those trucks now upon the market.

A further object of the present invention is to provide a truck having more stability without increasing the weight thereof, over existing trucks of like character.

A still further object is to provide an improved truck that may by the telescopic arrangement of its parts be readily folded and unfolded.

To these and other ends hereinafter set forth the invention stated in general terms comprises the improvements to be presently described and finally claimed.

Figure 1:
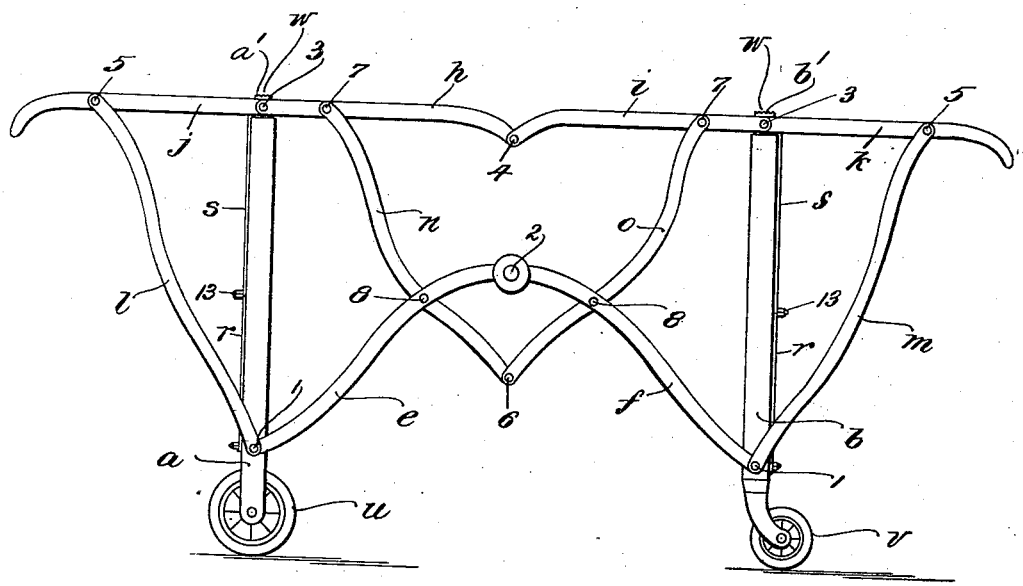
Figure 2:
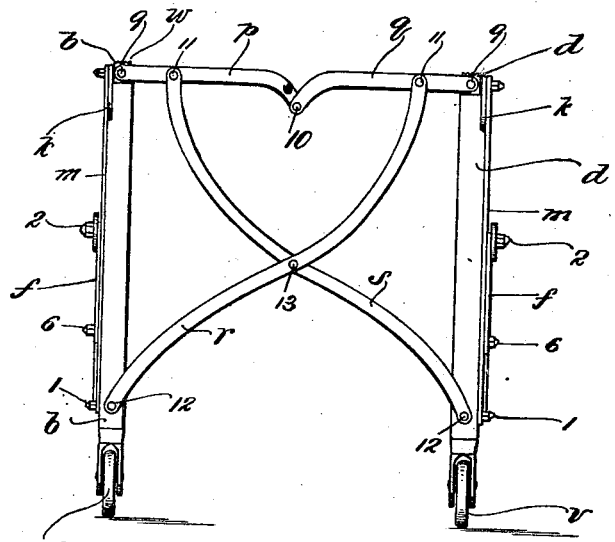

The nature and characteristic features of my invention will be more fully understood from the following specification taken in connection with the accompanying drawings forming part thereof, and in which Figure 1, is a view in elevation of one side of the truck of the invention. Fig. 2, is a view in elevation of one end of the same. Fig. 3, is a perspective view of the truck showing it in semi-folded position. Fig. 4, is a similar view of the same in folded position, and Fig. 5, is a sectional view of one of the telescopic posts and legs.

In the drawings $a$, $b$, $c$, and $d$, are legs formed from tubing. Associated with the legs and having telescopic relation therewith so as to form standards are posts preferably formed from tubing $a^1$, $b^1$, $c^1$, and $d^1$. The adjoining pairs of legs upon either side are connected by a pair of bars $e$ and $f$, pivoted at their inner ends to said legs at 1, and extended upward upon a curved line to the center line of the truck side, where they meet and are pivoted at 2. A pair of grips or handles $g$, see Fig. 3, extend inwardly from this point and facilitate in the carrying of the truck in folded position from point to point. The adjoining pairs of posts upon either side have pivoted as at 3, at their upper extremities inwardly extended bars $h$, and $i$, that meet in the center line of the truck side and are pivoted at 4. Pivoted also to the said posts at 3, and extended outwardly to form supports that terminate in handles are bars $j$, and $k$. Between the pivotal points 5, upon the said bars and the pivotal points 1, upon the legs, are connecting bars L and $m$.

$n$, and O, are a pair of bars pivoted together at the point 6, and extended upward in general V-shape and pivoted at 7, to the bars $h$ and $i$. These bars $n$ and $o$, intersect and have pivotal relation with the bars $e$ and $f$, at 8. The adjoining posts, at the respective ends of the truck, are at their upper extremities pivotally provided at 9, with bars $p$ and $q$, that extend inwardly and meet at the center line of the truck end and are pivoted at 10.

$r$ and $s$, are bars connecting the bars $p$ and $q$, with the legs at the pivotal points 11 and 12, and intersect each other at the pivotal point 13.

By using bars of curved outline the truck is made to appear more sightly and ornamental.

The legs $a$, and $c$, are bifurcated as at $t$, for the reception of rollers or casters $u$. The remaining legs of the truck are preferably provided with swivel rollers $v$, as shown in Fig. 5. As shown the roller $v$, is swiveled to the block $v^1$, which is inserted within the hollow leg and may be secured thereto as by the pin $v^2$. The upper part of the telescopic post may be roughened or notched as at $w$, to prevent slipping of a casket when in position upon the truck. A plug $w^1$, may also be provided to give a finished appearance to the post.

By the telescopic relation of the standards locking parts are dispensed with for the reason that when the standards are in normal position they rest upon the bottom interiors of the legs and thus tend to prevent spreading of the parts. Also the telescopic standards permit of the parts being readily opened and closed. This is possible since the standards, having attached thereto, a portion of the lazy tongs, naturally gravitate when the truck as a whole is pushed away from the body of the person using the truck and this gravitation of the standards obviously causes the lazy tongs to spread in an easy manner. It has been found that trucks having a mere lazy tongs connection between stationary posts cause much inconvenience due to the fact that the pivotal points bind when the truck is open and it becomes necessary to spread the lazy tongs with the hands. The telescopic standards are also useful in that they permit of the truck being folded into less bulky shape, since a great portion of the truck that ordinarily would be the width of the truck is carried up into height, thus making a more or less elongated shape.

The above described truck arranged, connected and constructed to act telescopically through the intervention of a series of lazy-tongs possesses among other things the advantage of being folded into a rectangular body of substantially regular outline, which obviously is advantageous in transportation or storage. It is light, strong and durable and the parts are very free in their action, and a person grasping the pair of end handles when in the position shown in Fig. 4, and pushing the truck outward or away from the body, the truck will spread out much as in the position in Fig. 3, and eventually assume its normal position, Fig. 1, without other attention and is ready for the reception of a casket. There are no locking parts, or stays to prevent spreading and the weight of the casket serves to keep the truck firm.

I do not intend by the use of the above language to limit my invention further than the prior state of the art may require, but

Having thus described the nature and objects of my invention what I claim as new and desire to secure by Letters Patent is

1. A collapsible truck comprising a plurality of two part telescopically fitted standards, and a series of lazy tongs arranged, connected and disposed between each adjacent pair of standards both at the sides and ends thereof.

2. A collapsible truck comprising a plurality of two-part telescopically arranged standards, a lazy-tongs connection between each adjacent pair of standards both at the sides and ends of the truck so arranged, constructed and connected in relation thereto that a portion of the lazy-tongs are carried by each of the respective members of the two-part standards.

3. A collapsible truck comprising a plurality of two-part telescopically arranged standards of which some of the parts form legs and the other parts are movable vertically thereof, a lazy-tongs connection between each adjacent pair of standards at the sides of the truck comprising a series of intersecting bars pivotally connected together at their inner ends and pivotally connected at their intersection and also pivotally connected at their outer ends to the legs, and oppositely arranged bars pivotally connected to said intersecting bars and pivoted together at their inner ends and having pivotal relation with the upper end of said vertically movable parts and a lazy-tongs connection at the ends of said truck.

4. A collapsible truck comprising a plurality of two-part telescopically arranged standards of which some of said part form legs and the other parts are movable vertically thereof, a lazy-tongs connection between each adjacent pair of standards both at the sides and ends of the truck so constructed, arranged and connected that a portion of the said lazy-tongs are pivotally carried by the legs and movable parts respectively, a pair of supports pivotally secured to the said movable parts at each end of the truck and projected outward beyond the same and a pivotal link between each of the said supports and legs.

In testimony whereof I have hereunto signed my name.

FRANK P. SPARMAKER.

Witnesses:
H. S. ECKELS,
W. J. JACKSON.